Aug. 24, 1954
L. H. SOMMER
2,687,418
DICARBOXYLIC ORGANOSILICON COMPOUNDS
Filed March 31, 1953
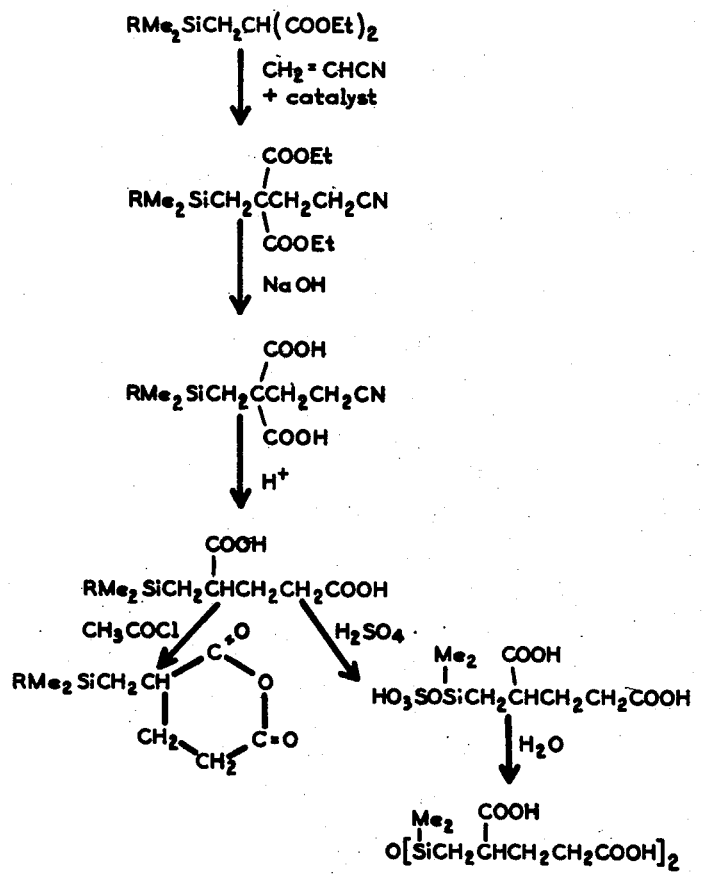
INVENTOR.
LEO H. SOMMER
BY Robert F. Fleming Jr.
ATTORNEY

UNITED STATES PATENT OFFICE 2,687,418

DICARBOXYLIC ORGANOSILICON COMPOUNDS

Leo H. Sommer, State College, Pa., assignor to Dow Corning Corporation, Midland, Mich., a corporation of Michigan Application March 31, 1953, Serial No. 346,053

4 Claims. (Cl. 260—345.9)

This invention relates to carboxylic acids containing silicon and to their anhydrides.

Alkyd type resins containing organosilicon compounds as substituents are well known commercial products. However, in most of these, the silicon is attached to the organic residue of the resin through a SiOC linkage. In such cases there is a potential hydrolytic instability in the finished product. This is due to the far greater susceptibility of the SiOC linkage than the $$\overset{O}{\underset{\|}{C}}OC$$

linkage to hydrolytic cleavage. The present invention relates to compounds which will form silico alkyd type resins without the inherent disadvantage of a SiOC linkage.

It is an object of this invention to prepare novel organosilicon dicarboxylic acids. Another object is to prepare organosilicon compounds which are useful in the preparation of resinous products of improved hydrolytic stability.

This invention relates to compounds of the formula $$R_aO_b[\overset{Me_2}{\underset{|}{Si}}CH_2\overset{(H)_c-O}{\underset{|}{C}}HCH_2CH_2\overset{|}{C}=O]_{b+1}$$

in which R is a phenyl or methyl radical, $a$, $b$ and $c$ are each integers from 0 to 1, the sum of $a+b$ is 1, $c$ is 1 when $b$ is 1 and both $c$'s always have the same value. When $c$ is zero the carbonyl carbons are linked through the oxygen atom O'.

Thus it can be seen that the compounds of this invention include both silane dicarboxylic acids and their anhydrides and a disiloxane tetracarboxylic acid. The silane dicarboxylic acids of the formula $$\text{RMe}_2\text{SiCH}_2\overset{COOH}{\underset{|}{C}}HCH_2CH_2COOH$$

where R is as above defined, are prepared by reacting diesters of the formula

RMe₂SiCH₂CH(COOEt)₂ with acrylonitrile in the presence of benzyl trimethyl ammonium hydroxide and thereafter hydrolyzing the resulting nitrile with sodium hydroxide followed by treatment with an acid. The resulting product is a triorganosilyl substituted methyl glutaric acid. The acid may be converted into the corresponding anhydride by treatment with acetyl chloride.

The above described silane acids are converted into the disiloxane of this invention by treatment with concentrated sulfuric acid. This results in a quantitative cleavage of the R group from the silicon with the formation of a silyl sulfate which, under the acidic conditions of the reaction, immediately hydrolyzes and condenses to give the disiloxane of the farmula $$O[\overset{Me_2}{\underset{|}{Si}}CH_2\overset{COOH}{\underset{|}{C}}HCH_2CH_2COOH]_2$$

The reactions of this invention may be more readily understood by referring to the accompanying flow sheet which shows the steps involved in the preparation of the silane dicarboxylic acids and their anhydrides and the disiloxane acid.

Both the silane dicarboxylic acids, their anhydrides, and the disiloxane carboxylic acid of this invention can be readily incorporated into polyester resins by reacting them with polyhydric alcohols. This reaction is carried out in the normal manner for the formation of such resins. In general reaction will proceed smoothly at temperatures of 150° C. or higher with the elimination of water. The resulting polyester resins have greater heat stability and weatherability than do polyester resins containing no silicon. Specifically, the acids of this invention can be reacted with glycerine to give excellent coating resins. In addition to polyester resins, the compounds of this invention react with diamines to give organosilicon modified polyamide resins. The modified resins so prepared are useful for protective coatings, electrical insulation and as molding compositions.

The disiloxane of this invention may be copolymerized with other siloxanes by means of rearrangement of the siloxane linkage. Thus, for example, the disiloxane may be copolymerized with dimethylsiloxane in the usual manner using acid catalysts such as sulfuric acid. In this way it is possible to obtain polysiloxane resins, fluids and elastomers which have carboxyl radicals distributed therein. For example, dimethylpolyoxane can be copolymerized with the siloxane of this invention to produce fluids in which the molecules have a dicarboxylic acid radical at each end. The siloxanes so modified are useful as additives for siloxane lubricants. They can also be reacted with polyhydric alcohols and diamines to form resins containing a high proportion of organosiloxane.

It is to be understood that the disiloxane acid of this invention can be copolymerized by means of its siloxane linkage with any organopolysiloxane wherein the organic radicals are monovalent hydrocarbon radicals or stable halogenated derivatives thereof (i. e. halogenated aryl hydrocarbon radicals and halogenated aliphatic hydrocarbon radicals having no halogen beta to the silicon or more than one halogen atom per carbon atom).

Esters of the formula $RMe_2SiCH_2CH(COOEt)_2$ are prepared by reacting the silanes $RMe_2SiCH_2I$ with sodium and diethylmalonate in an ethanol solution.

The following examples are illustrative only and should not be construed as limiting the invention which is properly delineated in the appended claims.

Example 1

246 g. of ethyltrimethylsilylmethylmalonate was mixed with 10 cc. of benzyl trimethyl ammonium hydroxide and 50 cc. of dioxane. The mixture was heated to 100° C. and 60 g. of acrylonitrile was added drop-wise over a period of one hour. The reaction mixture was maintained at 100° C. for 24 hours. The benzyl trimethyl ammonium hydroxide layer was then separated and the reaction product was acidified with HCl. Upon distillation of the acidified product, 255 g. of ethyltrimethylsilylmethylcyanoethylmalonate, $[Me_3SiCH_2C(COOEt)_2CH_2CH_2CN]$, was obtained boiling at 143° C. at 3.5 mm. pressure and having a refractive index at 20° C. of 1.4521.

Example 2

75 g. of ethyltrimethylsilylmethylcyanoethylmalonate, 51 g. of KOH, 200 ml. of water and 300 ml. of ethanol were refluxed for 3 days, during which time 100 ml. of ethanol was removed each day. At the end of this time, 75 ml. of concentrated hydrochloric acid was added and the mixture refluxed for one day, during which time $CO_2$ was evolved. The reaction mixture was then cooled and the water layer was separated. The organic layer was crystallized from a solution of 150 ml. of n-hexane and 5 ml. of diethylether to give 42 g. of alpha-trimethylsilylmethylglutaric acid, $[Me_3SiCH_2CH(COOH)CH_2CH_2COOH]$. After recrystallization from the above solvent mixture, the acid melted at 62–63° C. The neutral equivalent was 109 which is the same as the calculated neutral equivalent.

Example 3

11.7 g. of alpha-trimethylsilylmethylglutaric acid was reacted with 11 g. of acetyl chloride at reflux until no more HCl was evolved. Reaction mixture was distilled from a Claison flask to give 7.3 g. of a liquid boiling at 138–146° C. at 5 mm. and having a refractive index of 1.4712 at 20° C. This material was the acid anhydride having the formula

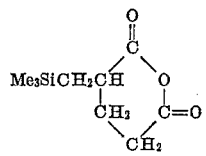

It was found to have a melting point of 14.5–15.5° C. A small sample of the anhydride was exposed to the atmosphere for one month at the end of which time it had been converted to the acid which melted at 61–63° C.

Example 4

21.9 g. of alpha-trimethylsilylmethylglutaric acid was reacted with 103 g. of 95 per cent sulfuric acid for 24 hours at 5° C. The theoretical amount of methane was obtained. The reaction mixture was poured onto ice and extracted with ether. The ether layer was separated and the solvent was removed on a steam bath. The resulting residue was washed with benzene and water and finally recrystallized from water to give a melting point of 83–85° C. This product was the disiloxane acid having the formula

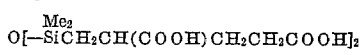

Example 5

When ethylphenyldimethylsilylmethylcyanoethylmalonate is hydrolyzed and decarboxylated in accordance with the procedure of Example 2, alpha-phenyldimethylsilylmethylglutaric acid $[C_6H_5Me_2SiCH_2CH(COOH)CH_2CH_2COOH]$ is obtained.

When this acid is reacted with acetyl chloride according to the method of Example 3, the acid anhydride

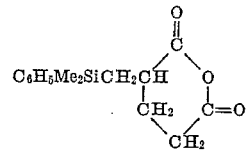

is produced.

That which is claimed is:

1. A compound of the formula

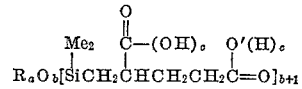

in which R is of the group consisting of methyl and phenyl radicals, a, b and c are each integers from 0 to 1, the sum of $a+b$ is 1, c is 1 when b is 1, both c's always have the same value and in which compound when c is zero the carbonyl carbons are linked through the oxygen atom O'.

2. A compound of the formula

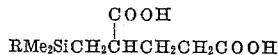

where R is of the group consisting of phenyl and methyl radicals.

3. A compound of the formula

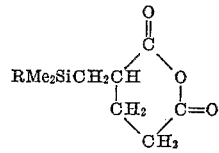

where R is of the group consisting of phenyl and methyl radicals.

4.

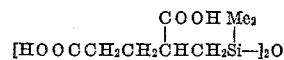

References Cited in the file of this patent

UNITED STATES PATENTS

| Number | Name | Date |
| --- | --- | --- |
| 2,628,245 | Speier, Jr. | Feb. 10, 1953 |
| 2,629,727 | Speier, Jr. | Feb. 24, 1953 |